June 4, 1935.  L. F. NOCK  2,003,864

METHOD OF PERMANENT MOLD MANUFACTURE

Filed April 17, 1930  5 Sheets-Sheet 1

Inventor
Leo F. Nock
Slough and Canfield
By
His Attorneys

June 4, 1935. L. F. NOCK 2,003,864
METHOD OF PERMANENT MOLD MANUFACTURE
Filed April 17, 1930 5 Sheets-Sheet 2
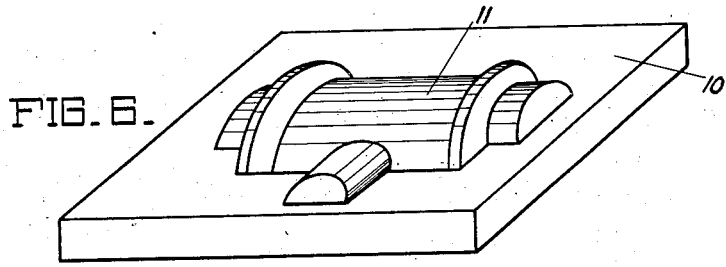
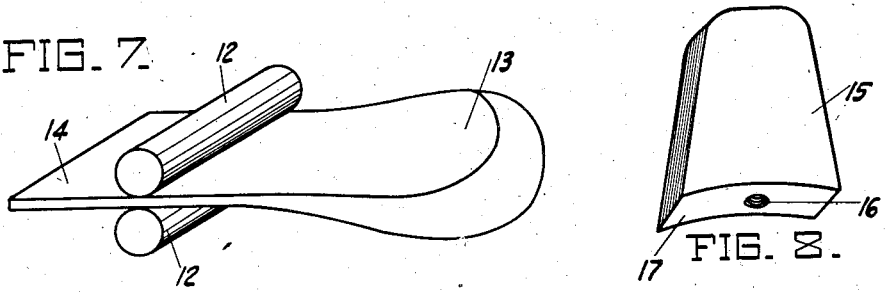
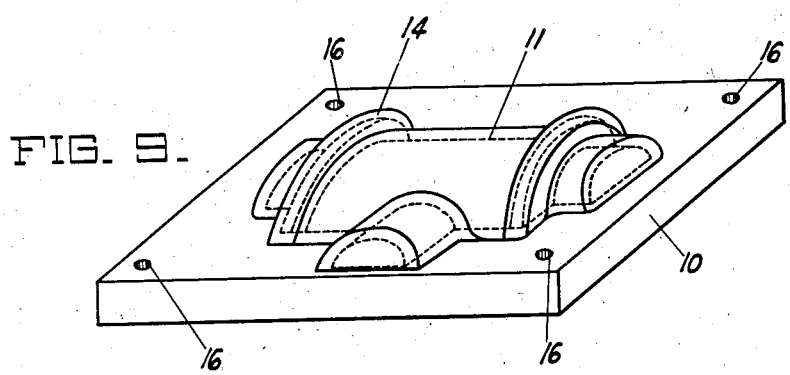
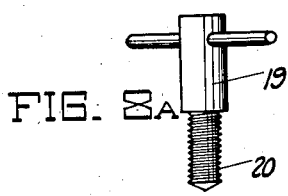

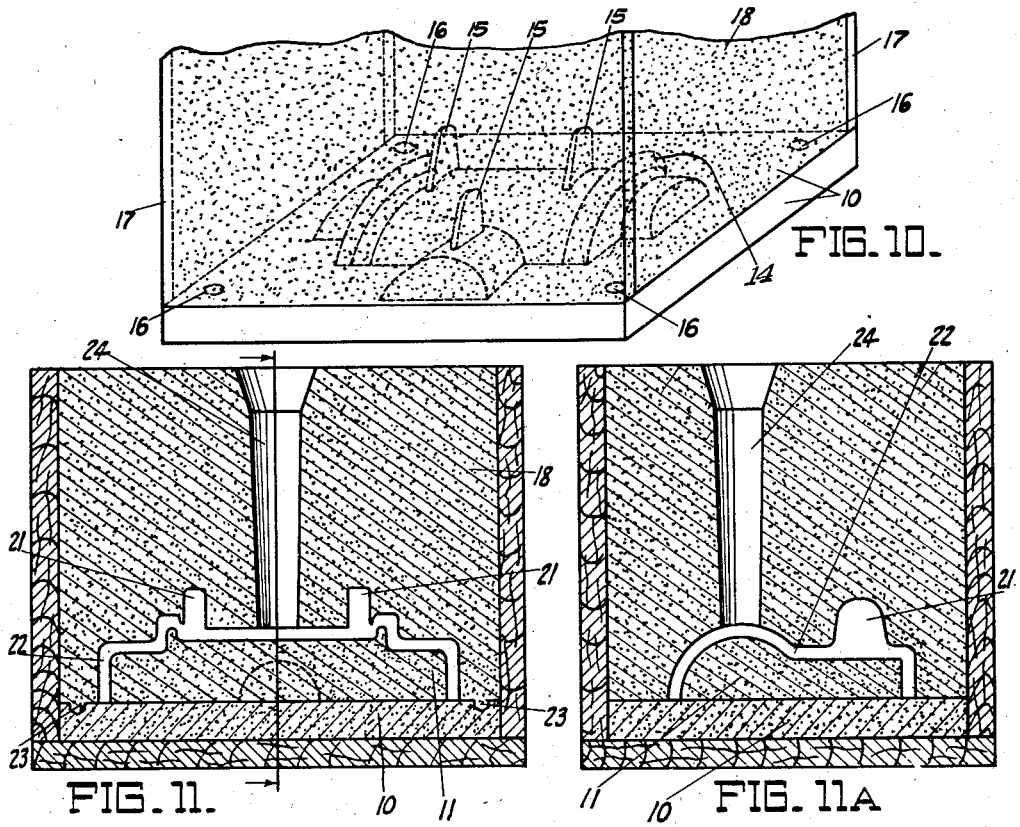
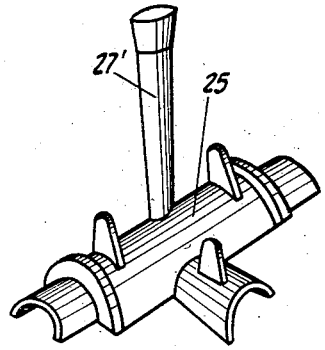
FIG.12.
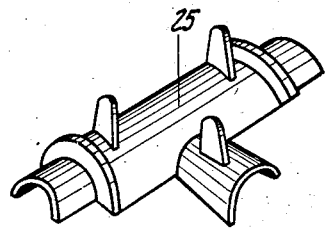
FIG.12A

June 4, 1935.  L. F. NOCK  2,003,864
METHOD OF PERMANENT MOLD MANUFACTURE
Filed April 17, 1930  5 Sheets-Sheet 4
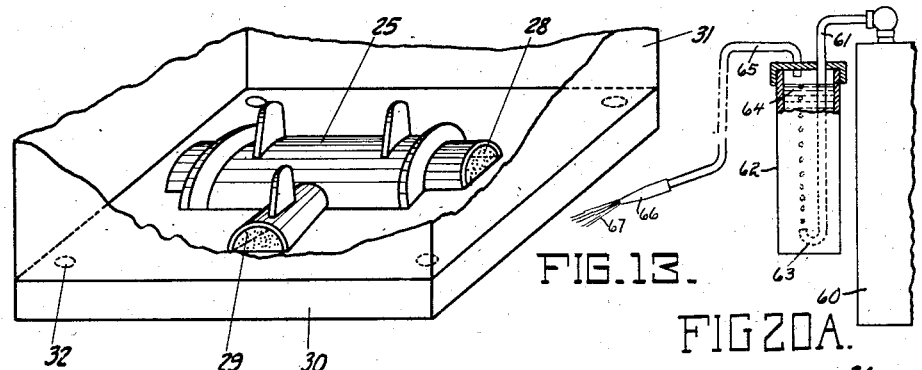
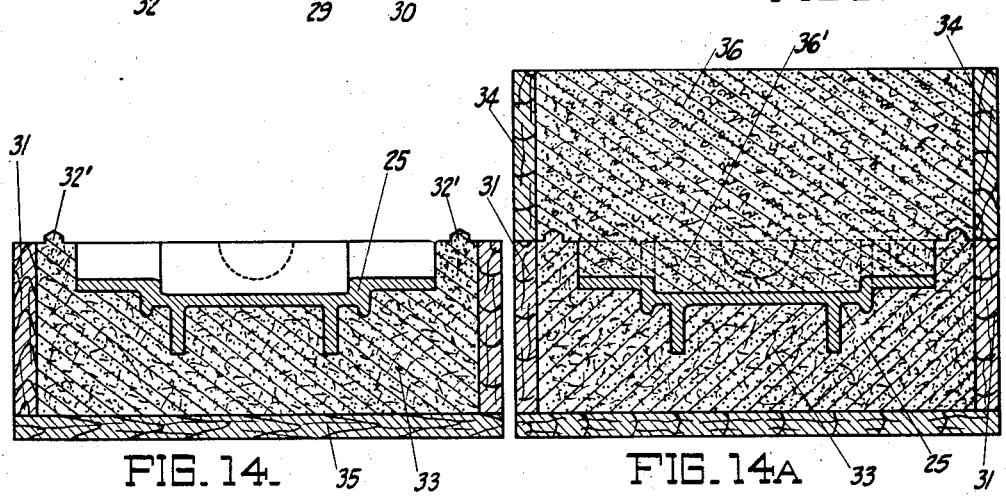
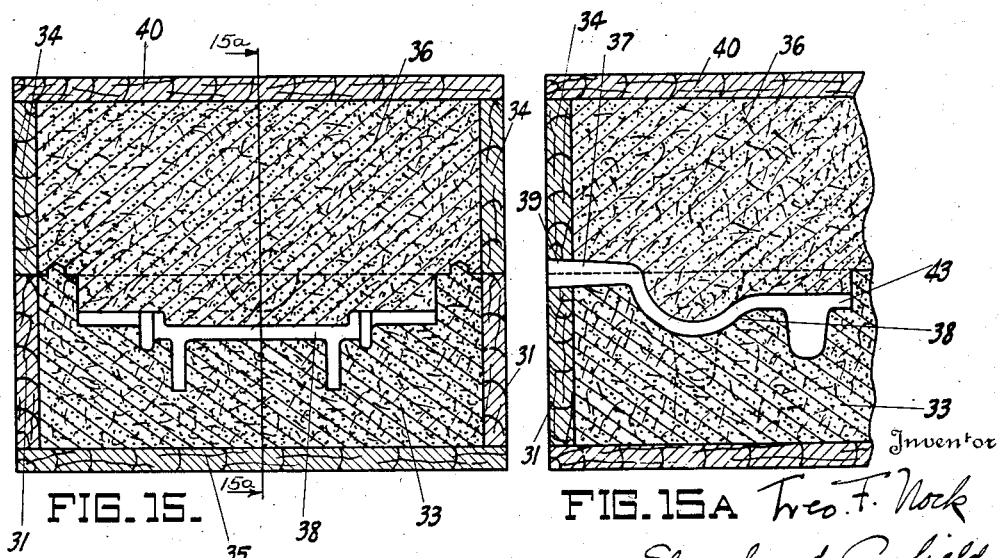

Patented June 4, 1935

2,003,864

UNITED STATES PATENT OFFICE 2,003,864

METHOD OF PERMANENT MOLD MANUFACTURE

Leo F. Nock, Elyria, Ohio

Application April 17, 1930, Serial No. 445,087

6 Claims. (Cl. 22—190)

My invention relates to permanent molds and relates particularly to the preparation of permanent molds, by a novel "plastic" molding process.

Heretofore preparation of permanent molds for molding metallic articles has been accomplished only as a result of very considerable work and difficulty, at a considerable expense, and difficulty has moreover been experienced in preparing permanent molds for casting articles having irregular outer surfaces, such as replicas of sculptured objets d'art, such as, for instance, bookends having outer ornamental surfaces, plaques, and the like.

The art of die-casting has come into progressively greater commercial favor coincidentally with the development of improvements making possible the obtainment of precise castings of intricate design and without the necessarily expensive machine operations.

My invention, therefore, relates to the art of manufacturing a permanent metal mold by casting it, or complementary parts of it, by a so-called "plastic" process.

An object of my invention is to effect an improvement in the art of producing permanent molds for accurately molding metallic articles.

Another object of my invention is to effect an economical and relatively rapid production of permanent molds for casting articles, from metals fluent at relatively high temperatures.

Another object of my invention is to effect the production of permanent molds by a novel plastic process, whereby highly accurate reproduction effects may be secured.

Another object of my invention is to effect improvements in the manner of casting articles requiring a core, for a permanent mold.

Other objects of my invention and the invention itself will become apparent from the following description of an embodiment of my invention, and in which description reference will be had to the accompanying drawings.

Referring to the drawings:

Figs. 4, 5, 6 and 7 illustrate, in isometric view, the products of successive steps of my improved process;

Figs. 8 and 8A illustrate a prong and a prong removing tool employed in later steps of the process;

Figs. 9, 10, 11, 11A, 12, 12A, 13, 14, 14A, 15, 15A, 16, 16A, 17, 18 and 19, illustrate the products of succeeding steps of my improved process;

Fig. 20A is an elevational view of an acetylene gas supplying apparatus preferably employed during my improved process.

Referring now to all of the figures of drawings which mostly are in isometric view, and more or less diagrammatically in form, for the purpose of illustrating the process of my invention, I have illustrated the resultant products of different steps, each succeeding the preceding step, in order, so that the method of carrying out my invention will be most readily understood.

Figure 1:
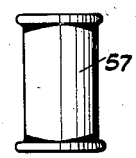
Fig. 1 shows, in side elevation, for the purpose of illustrating the improved process of my invention, a pipe coupling which is to be reproduced in quantities from a permanent mold to be made according to my improved "plastic" process.

In the drawings, Fig. 1 shows a hollow approximately cylindrical pipe coupling for the making of which, in quantities, successive steps of an improved process will, in the other figures, be illustrated, involving the ultimate production of a permanent mold by means of which the article may be reproduced in quantities accurately, and without difficulty.

Figure 2:
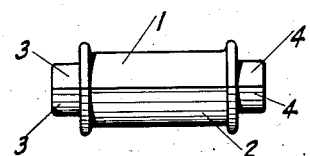
Fig. 2 shows in side elevation, two superposed complementary wood patterns of the form of the article to be produced, with core-print ends made in any usual manner.

A pair of wood patterns, illustrated in Fig. 2 at 1 and 2, are first made in the ordinary way, in the form of like complementary longitudinally divided, somewhat enlarged, halves of the article desired, as illustrated in Fig. 1, each half being preferably formed with core-print ends 3 and 4 projecting longitudinally therefrom.

The production of permanent mold parts for each of the halves being accomplished in the same way, the process of producing a permanent mold part for the half 1 will now be described.

Figure 2A:
Fig. 2A shows, in isometric view, a wood pattern part.
Figure 3:
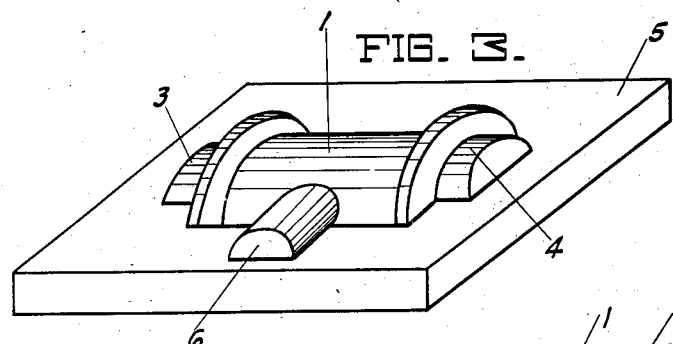
Fig. 3 shows, in isometric view, one of the like complementary parts of Fig. 2, placed with its plane surface downwardly on a smooth surface, with the mold pattern part of Fig. 2A illustrated as affixed thereto, for the purpose of forming a gate for the permanent mold to be made by my process.

The pattern part 1 with its ends 3 and 4, is placed with its flat surface on a smooth plate 5, such as glass or the like, shown in Fig. 3, and a wood pattern part 6 to form a permanent mold gate, preferably separately made as illustrated in Fig. 2A, is affixed to a lateral surface of the wood part. The gate pattern is preferably semicylindrical in cross-sectional form, and provided with a suitably formed cylindrically grooved end surface, to adapt it for intimate engagement with the lateral surface of the part 1, to which it is affixed, and of which, henceforth, it will be considered to be an integral part.

Figure 4:
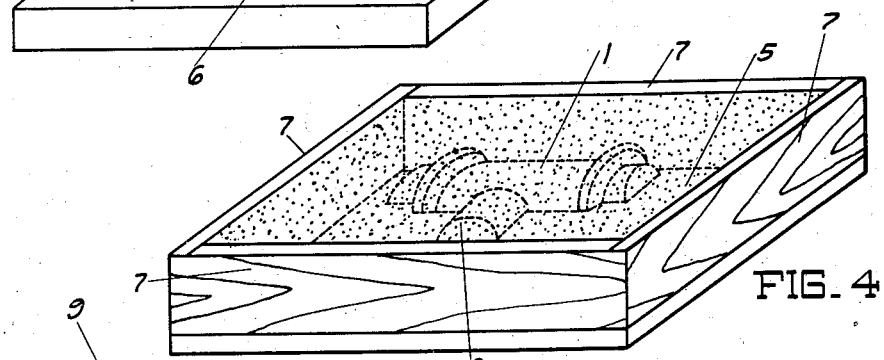

The parts 1 and 6 on the plate 5 are shown in Fig. 4 as submerged at the bottom of a layer of plaster of Paris, which is poured onto their upper surfaces as a plastic, indicated by stippling in the drawing, and confined on the plate 5 by boxing frame side members 7.

Figure 5:
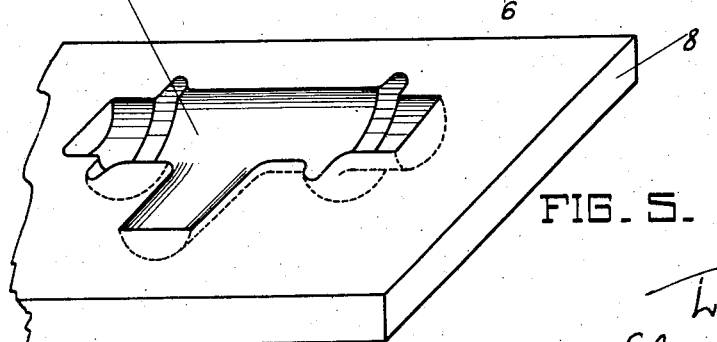

In this way, after the plastic plaster of Paris is set, a cast illustrated in Fig. 5, inverted, taken of the exposed surfaces of the pattern parts placed on the plate of Fig. 3, is secured, the cast being in the form of a solid plaster of Paris plate 8, which removed from the box of Fig. 4, contains a mold cavity 9 on one of its surfaces, which complementarily corresponds to the form of the pattern of Fig. 3.

The uppermost surfaces of the plaster of Paris plate 8, including those of the mold cavity 9, are then shellacked, or given such other suitable surface finish as will permit the surfaces to be employed for molding, and a plaster of Paris cast article 10, illustrated in Fig. 6, is then secured by the ordinary method, as previously described for the plate of Fig. 5, by applying a boxing, such as that shown at 7, Fig. 4, to the sides of the plate 8, and then pouring plaster of Paris on to the top of the upper surface of the plate 8, as viewed in Fig. 5, and then when the plastic plaster of Paris upper layer is removed the plaster of Paris cast 10 of Fig. 6 is produced. The cast mold plate 10 is shown in Fig. 6, inverted from its position when in the boxing together with the plate 8.

In Fig. 7, there is illustrated diagrammatically, a pair of calendaring rolls 12, and a sheet 14 of molding clay of uniform thickness is produced by passing clay between the rolls as indicated.

The plate 10 of Fig. 6, is recessed near its corners as at 16, Fig. 9, with the male cast 11 thereon, and is then covered with a layer of clay from the sheet 14, having a uniform predetermined thickness all over the surface of the male cast 11. The thickness of the clay in the sheet 14 determines the thickness of the clay layer applied, and this is predetermined by the thickness of wall of the ultimate permanent mold part desired to be produced, the usual allowance being made for shrinkage of metal occuring in subsequent steps of my process.

I make a plurality of pattern parts or prongs 15 with a threaded recess 16 at an arcuately formed end 17, as in Fig. 8. The plurality of metal or wood inserts 15 are then placed with their recessed ends projected into the material of the clay 14 overlying the male plaster of Paris mold cast, and suitable boxing sides 17 are applied to enclose the plate 10 as shown in Fig. 10, and plaster of Paris, indicated by stippling in Fig. 10, is poured into the box thus formed, entirely submerging the clay covered male pattern. The prongs 15 project from the upper surface of the clay in spaced relation, and within the layer 18 of plaster of Paris, which is poured thereabouts to such a considerable thickness as will be noted by reference to Fig. 11.

A resulting pattern 18, of plaster of Paris, when "set" is then taken from the boxing 17. The layer of clay 14 is removed from the interior of the cavity and discarded, and the prongs 15 removed with the clay, preferably by use of a tool 19, illustrated in Fig. 8A, by threading the end 20 of the tool into the threaded recesses 16 of the prongs, and subsequently thereby pulling the prongs from the plaster of Paris recesses 21, and from the mold cavity 22 thereof.

After the clay 14 has been removed from the surfaces of the male cast 11, the cast 18, having the mold cavity 22 on its lower surface, is then superposed over the plate 10 with the formed projections 23 of the cast 18, fitting snugly within the complementary recesses 16 of the cast plate 10, to properly align the upper and lower mold parts 18 and 10. This positioning of the parts is illustrated in Fig. 11.

Prior to the superposition of the cast 18 over the plate and cast 11, I form the pouring gate passage 24 by the use of a tapered reamer, or by inserting a subsequently removable tapered plug, of a form corresponding to the passage 24, into the material of the cast 18 and extending downwardly from the upper surface to engagement with the layer of clay 14, as employed in Fig. 10 and then removing the plug, after the plaster of paris is "set".

The views of Figs. 11 and 11A are taken at right angles each to the other and are sectional views taken diametrically through the two angularly disposed portions of the male pattern part 11, corresponding to the parts 1 and 6 of Fig. 3. As shown by Fig. 11 and 11A, when the cast 18 containing the recess 22 is superposed over the plate 10, with its upwardly projecting male cast portion 11, a space will be provided between the cavity of the cast 18 and the male cast portion 11 of the plate 10, corresponding exactly in form to the clay layer 14 previously occupying the space between these parts. The recesses 21 thus provided in cast 18 and disposed above the recess formed therein by clay layer 14 will exactly conform to the prong 15 removed from these parts, as illustrated in Fig. 10.

Molten metal having a melting point preferably of between 150° and 200° Fahrenheit, is then poured downwardly through the gate 24 and passes into the spaces 22 and 21, between the upper and lower mold parts 10 and 18.

Although composition of such a metal may vary, I find very suitable a well known metal called "Wood's metal", which melts at 180° Fahrenheit, and has a composition substantially as follows: 12.5 parts cadmium, 12.5 parts tin, 25 parts lead, and 50 parts bismuth. Sometimes I employ as much as 20% more bismuth than as given by the above formula.

The metal being introduced into the mold cavity 22—21, and solidified by cooling, the mold is then disassembled, and a metal casting 25, as illustrated in Fig. 12, is secured, which is entirely of Wood's metal. This metal is of considerable strength and rigidity, and has practically a zero coefficient of thermo-expansion, so as to permit its ready molding in a mold of pure plaster of Paris, as illustrated in Figs. 11 and 11A and described in connection therewith. Subsequently the gate 27 is removed by grinding so that the resultant casting of Fig. 12A is secured.

In the previously described steps of my process, it will be understood that prior to each use of plaster of Paris cast blocks, produced by the different steps of my plastic process, these blocks are dried in an oven, or in any other suitable way so as to insure that the products will be sufficiently resistant to breakage and sufficiently dry prior to introduction of molding material, as to insure the production of faithful mold copies of the surfaces.

The next step in the process indicated in Fig. 13, comprises the placing of the metal part illustrated in Fig. 12A, face downward on a plate, having the indenting corner surface depressions as previously referred to for such plates, and plugs 28 and 29, illustrated in Fig. 13, to plug up the entrances of the resultant passages into the interior of the casting. The plate is shown at 30 and a boxing comprising lateral sides enclosing the part 25, is shown at 31, the corner depressions being shown at 32.

Before placing the part 25 on the plate 30, the model casting is carefully inspected and surface blemishes are corrected by filing or by grinding, or in any other suitable way.

The boxing 31 surrounding the metal part 25, is then filled with a plastic mixture of plaster of Paris and a heat-resistant fibrous material, such as asbestos fibre.

A cast block 33, Fig. 14, is thereby formed, indenting projections 32' extending from its molded surface, shown in Fig. 14 as being uppermost. The plugs 28 and 29 are removed after the boxing 31 with the contained blocks 33 is removed from the surface of the plate 30 of Fig. 13, and the block 33 is inverted on a plate 35, which may be one of the plates previously used or another plate like them.

Boxing side frame members 34 are superposed over the similar box members 31 to increase the depth of box thereby provided, and a mixture 36 of plaster of Paris and asbestos fibre, or the like, is poured into the box, filling the same and permeating the recess of the metal part 25 to form a projection 36' extending into the block 33 over the interior surfaces of the metal mold part 25. The boxing 34 with the contained molded block 36, having the projection 36' is then removed from the block 33 and the metal part 25.

The metal part is then removed and discarded, and the blocks 36 and 33 are replaced in superposed position after a gate recess 37 is provided between the surfaces of the blocks, which are adapted to be disposed contiguously, by gouging the plaster of Paris and asbestos mold material from contiguous surfaces of the two mold parts, to make the recess indicated at 37 in Fig. 15A.

Fig. 15 indicates the superposed blocks 36 and 33 with the recess 38 in the form of the metal piece 25, between them, and Fig. 15A is a sectional view at right angles to that of Fig. 15, showing the recess 38 and the gate passage 37 communicating therewith and formed by contiguous surfaces of the blocks 36 and 33. A gate opening 39 is provided in the box frame members 34 and 31.

The recess 38 provides a mold cavity into which I then pour a non-ferrous metal, such as bronze, or the like, through the gate passage 37, which for the purpose, is disposed uppermost in a vertical position by turning the boxed parts, as illustrated in Figs. 15 and 15A, around after previously fixing end wall 40 to the side frame 34.

Prior to pouring the molten non-ferrous metal into the mold cavity through the gate 37, I preferably exhaust all air or gas from the mold or core, whereby when the molten metal is subsequently admitted into the interior of the mold, there being little or no trapped air or gas in the mold, expansion due to heat will not occur and air or gas will therefore not be driven into the metal material to cause it to be porous and have an uneven recess surface.

Preferably the pouring of the hot non-ferrous metal into the mold cavity is accomplished while the mold is maintained in an atmosphere which has become exhausted close to the point of vacuum, whereby the air remains withdrawn from the mold and the hot fluid metal takes its place entering all parts of the cavity and air being then suddenly admitted, the pressure of atmosphere exerted through the mold gate opening on the molten metal presses it into the mold cavity to insure a complete sharp casting.

In Fig. 20A, is shown a bottle 60 from which acetylene gas is supplied through a tube 61 to the interior of a jar 62 containing kerosene, the gas being introduced at 63 near the bottom of the jar, from which in the form of bubbles the gas is discharged through the kerosene to the top portion 64 of the bottle and thence through a discharge tube 65 containing a nozzle 66 at its end from the tip of which the gas 67 emerges and being ignited burns.

Before pouring the high melting point non-ferrous metal into the mold cavity, I preferably coat the surfaces of the gate 37 and of the opposing walls of the space 38, of the mold cavity, with a uniform layer of lamp black, or the like, and preferably project the same thereon by means of an acetylene flame issuing from a nozzle. In coating such surfaces the flame from the nozzle is directed thereon and the lamp black carried by the flame is deposited to form a layer which is of uniform thickness. I find that lamp black layers so projected thereon are always of the same thickness.

Instead of kerosene for the jar 62 other materials preferably liquid may be substituted, the materials being chosen with a view to the readiness with which they are absorbed by the gas to change its character in such a way that a better protection for the surface of the molds described herein may be had.

Figure 16:
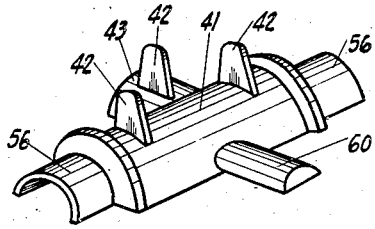
Figure 16A:
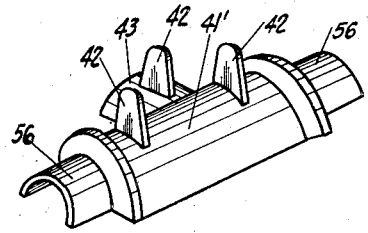
Figure 17:
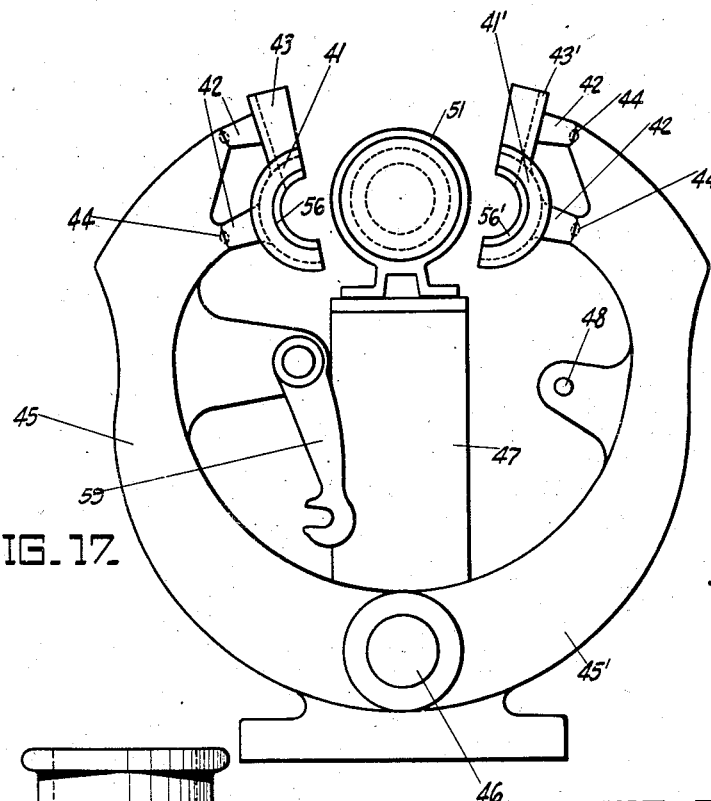
Figure 18:
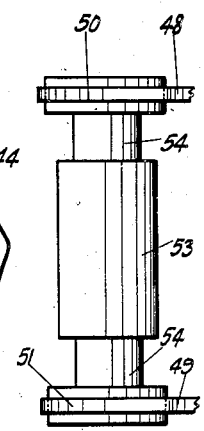

The molten metal poured into the mold cavity 38 through the gate 37, upon solidification, forms a permanent mold part 41 illustrated in Fig. 16, with a superfluous integrally secured gate 60 affixed thereto, the gate 60 being subsequently ground off and the article 41, ready for use in a permanent molding apparatus, being illustrated in Fig. 16A.

The purpose of the prongs 42 integrally formed with the body of the article 41, is to permit ready supporting of the permanent mold parts, such as 41. Two such parts are provided, the other being shown at 41', and is produced in the same manner as 41, starting with the wood pattern part 2, Fig. 2, instead of the wood pattern part 1, as described for the production of the permanent mold part 41.

The gate for the permanent mold is formed by complementary gate halves 43 and 43', each integrally formed with the mold parts 41 and 41', as a result of the initial making of the pattern part 6, Figs. 2A and 3, and the subsequently formed molded parts influenced thereby.

The prongs 42 are adapted to be secured by welding or the like, at their ends, to ends 44 of supporting fingers which are preferably integrally formed with oscillatable arms 45 and 45' respectively, of a molding machine.

The arms 45 and 45' are pivotally joined together at 46 and a latch 59, with a pin 48 cooperating therewith, of any suitable form, is employed for tightly holding the jaws of the arms 45 and 45', comprising the permanent mold elements 41 and 41', together in close fitting engagement, by their contiguous surfaces. A standard 47 extends from the support for the pivoting mechanism 46. A pair of end supporting elements 48 and 49, having annular supports 50 and 51 at their respective ends, extend upwardly from the support 47 in spaced relation.

Figure 20:
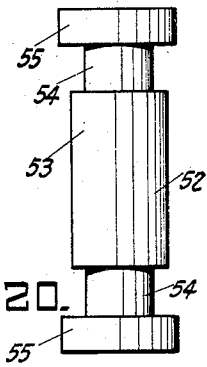
Fig. 20 is a side elevational view of a core element which may be employed in molding articles from the molds made according to my invention.

In order to produce the article of Fig. 1, a core of some kind is necessary, and I preferably employ a core formed by a plastic mold process, and therefore cast in a plastic mold a suitable core for the mold cavity, this being illustrated in Fig. 20 at 52. It will be noted that this core comprises a central substantially cylindrical portion 53, core print engaging ends 54, and terminal annularly flanged portions 55. The flanged ends 55 are of such a diameter as to fit snugly within the annular holders 50 and 51.

The intermediate core-print portions 54 are of a diameter adapted to snugly fit within the core-print end portions 56 and 56' of the permanent mold elements 41 and 41', respectively. The intermediate core portion 53 is adapted to be of such a reduced diameter as to be so spaced from the opposing internal surfaces of the mold cavity contained between the molding elements 41 and 41', as to permit molten metal poured downwardly between the gate elements 43 and 43', to pass freely around the core portion 43 and to fill the mold cavity so produced. The diameter of the core 53 is predetermined by the diameter of bore required in the finished article of Fig. 1.

After sufficient of the molten bronze metal, is employed for the making of the article of Fig. 1, to fill the mold cavity including the gate passages, cooling of the molten metal is had to cause it to solidify, after which the arms 45 are swung apart by unlatching of the latch and pin mechanism 59—48, and the molded article with the core element of Fig. 20, is taken from the mold.

The core element is readily removable from the article by breaking it up, it being of a plastic composition comprising 50% plaster of Paris and 50% asbestos fibre or the like.

In making the core of Fig. 20 and the molding blocks 36 and 33, I employ a mixture of 50% plaster of Paris and 50% of fine asbestos fibre, by volume.

It will be understood, also, that after each molding operation, involving the making of an article employing the composition of plaster of Paris and asbestos fibre, the molded parts are subsequently dried, and the drying is preferably accelerated in any well known manner, such as by drawing air, through the mold blocks in any suitable way.

It will be understood that in molding with the permanent mold of my invention, with a core of plastic material as described, that a separate core must be provided for each article to be produced, and these are made so as to be readily insertable in the holder annuli 50 and 51, being preferably loose fitted therein, reliance being mainly placed on the core-print ends 56, for axial positioning of the mold cores relative to the cavity of the permanent mold elements 41 and 41'.

Prior to pouring molten metal into each and all of the mold cavities above described, I preferably place the plaster of Paris and/or plaster of Paris and asbestos fibre mold under a vacuum and then readmit air to the mold with the molten metal therein before the metal has entirely chilled to insure good sharp non-porous castings.

Figure 19:
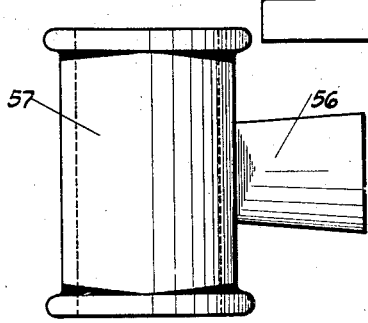

The article produced, after removal of the core material, is illustrated in Fig. 19, and is subsequently operated on by a grinding or other process, to remove the gate material shown at 56, leaving the article 57, as illustrated in Fig. 1.

Having thus described my invention in a specific embodiment process, for the making of a specific article, I am well aware that numerous applications of the principles of my invention may be had in processes varying non-essentially from the process steps as herein outlined, for the production of a given article, and that my process may be employed in its essentials, for the making of other specific articles, varying widely in form from that herein illustrated and described, for the purpose of illustration.

I claim:

1. The process of producing permanent molds comprising successively forming, in suitable material, complementary mold patterns, forming plastic mold elements from each pattern, pouring molten metal of low melting point and negligible coefficient of thermo-expansion into the mold elements, and applying to the resultant articles of low melting point metal, a plastic material comprising a high percentage of a heat resistant fibrous material, such as asbestos, to form molds, and then casting complementary non-ferrous metallic permanent mold elements, by pouring molten non-ferrous metal into molds so produced.

2. The method of forming permanent mold sections of non-ferrous metal comprising the preparation of a pattern, then making a plaster of Paris cast about the pattern to form a mold, subsequently pouring a thermal metal which does not expand or contract materially under different conditions of heat, into the mold cavity to form a second pattern forming a plaster of Paris mold around the said second thermal metal pattern and subsequently withdrawing the said second pattern to leave a cast mold, utilizing a high percentage of heat resistance fibrous material such as asbestos, as a component part of the plaster of Paris, and pouring a molten non-ferrous metal of high melting point into the cast mold so produced.

3. The process of producing permanent molds, comprising making complementary mold pattern element, making a plastic mold from each pattern element, then forming mold elements in the plastic molds, of metal of negligible coefficient of thermal expansion, then employing the resulting mold elements as patterns for forming complementary molds of plastic material having a high percentage of heat resistant fibres, and then forming complementary non-ferrous metallic permanent mold elements by casting in the molds so produced.

4. The method of preparing permanent mold sections for molding articles of metal such as aluminum, comprising first the preparation of patterns in the form of the mold sections, then making an induratable plastic cast about each pattern to form a mold on a surface of a plastic block, then applying a layer of induratable plastic material to the formed surface of said block to form a second cast, then applying a layer of non-induratable material, such as molding clay, of approximately uniform thickness to the molded surface thus produced in the form of the original pattern, then in applying a layer of induratable plastic material over the non-induratable layer to make a cast of the outer surface thereof, then discarding the intermediate layer of non-induratable material and pouring a molten metal of negligible coefficient of thermal expansion into the space formerly occupied by the non-induratable layer through a gate opening, subsequently removing the metal cast, then in making a plastic cast of the metal cast article thus produced, of an induratable plastic material containing a large percentage of heat resistant fibres, and then pouring into the recess of the cast mold thus produced, a molten metal such as bronze or the like, to form the permanent mold section through a suitable gate passage provided for the purpose, and subsequently removed.

5. The process of producing permanent molds comprising producing complementary mold patterns, reproducing the said patterns from induratable plastic material on an induratable plastic block, then applying a removable layer of plastic material to the molded pattern surface of substantially uniform thickness, then applying a layer of induratable material over the removable layer, removing the removable layer and forming a thermal metal cast of low melting point metal in the cavity so produced, then reproducing the casting so formed from metal to form a permanent metal mold.

6. The process of producing permanent molds comprising successively forming, from suitable material, complementary mold patterns, forming plastic mold elements from each pattern, pouring molten metal of low melting point and negligible coefficient of thermal expansion into the mold elements applying to the resultant articles of low melting point metal a plastic material comprising a high percentage of a heat resistant fibrous material such as asbestos to form molds, applying a coating of lamp black to the molds by projecting a flame formed of an admixture of hydrocarbon gas and absorbed liquid of high carbon content upon the mold, and then casting complementary non-ferrous metallic permanent mold elements, by pouring molten non-ferrous metal into molds so produced.

LEO F. NOCK.